June 24, 1941. H. B. WHITE Re. 21,846
SUCTION CLEANER
Original Filed July 31, 1931
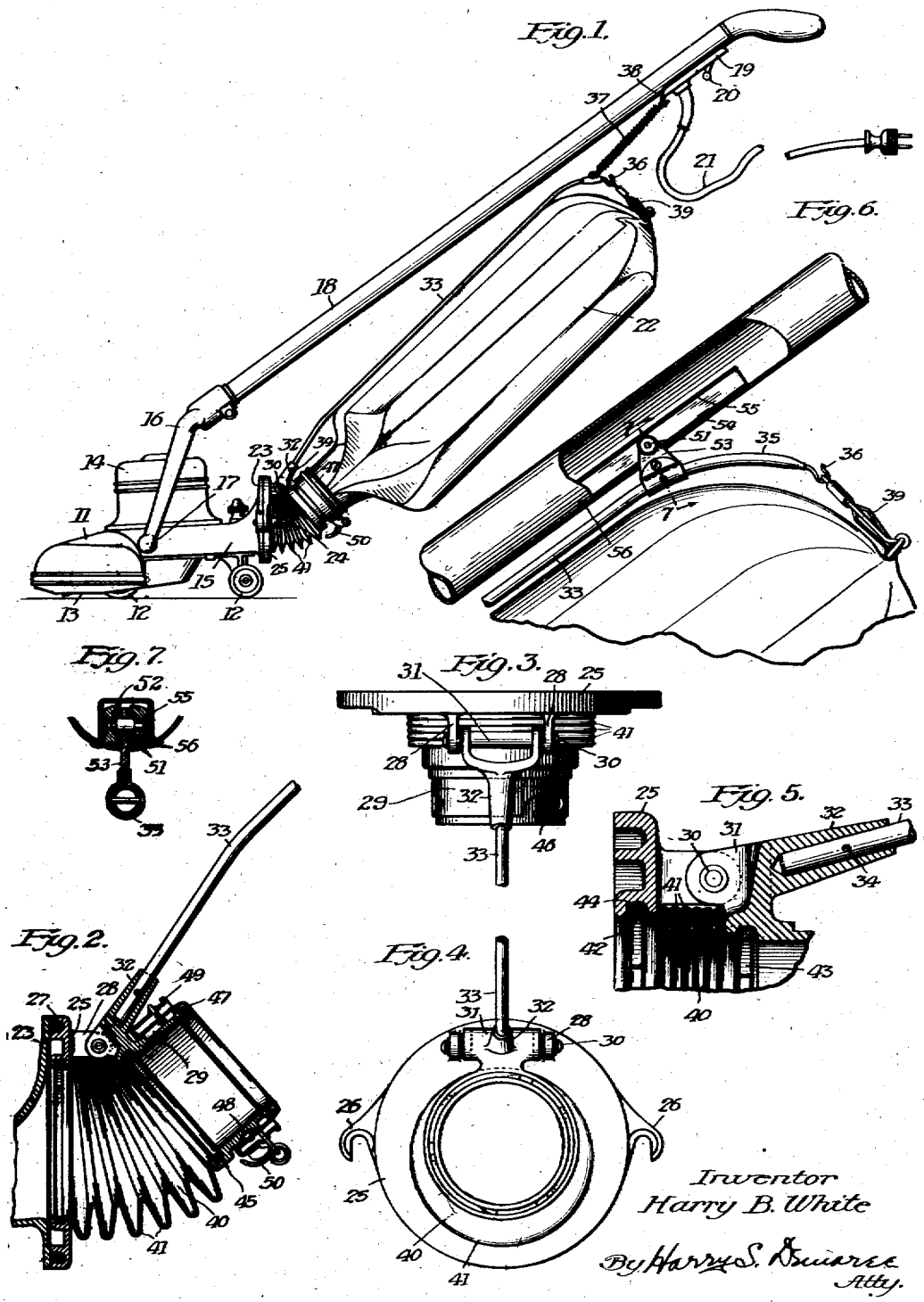

Reissued June 24, 1941

Re. 21,846

UNITED STATES PATENT OFFICE 21,846

SUCTION CLEANER

Harry B. White, North Canton, Ohio, assignor to The Hoover Company, North Canton, Ohio, a corporation of Ohio Original No. 2,099,413, dated November 16, 1937, Serial No. 554,271, July 31, 1931. Application for reissue July 3, 1939, Serial No. 282,742

14 Claims. (Cl. 15—16)

The present invention relates to suction cleaners, particularly those known as portable suction cleaners provided with a handle pivoted to the body of the cleaner by which the apparatus as a whole may be directed over the carpet or other floor covering which is being cleaned. With cleaners of this type it is customary to use a dust filtering bag formed of cloth, cellulose fiber felt, or other material, which is detachably secured to the body of the cleaner at a point separated somewhat from the point of pivotal attachment of the cleaner handle, the upper end of the bag being supported from the handle at a point adjacent its upper end. It will be apparent that, in such constructions, the lower end of the bag, adjacent its point of attachment, will be repeatedly flexed and the bag will be at times under tension lengthwise, as the handle is moved up and down during use of the cleaner, resulting in rapid wear and causing frequent replacement of the bag.

This invention pertains particularly to the attachment and support of a suction cleaner bag, and one of the objects of the invention is to provide means for attaching the bag to the body of the cleaner and supporting it from the handle which will relieve the bag of all flexure or strain as the handle is moved. A further object is the provision of means for this purpose which will be efficient and durable, which may be economically manufactured, and which will facilitate attachment of the bag, or removal of it for emptying. A still further object is to provide a flexible connection between the cleaner outlet and the bag which will be durable and will effectively prevent leakage, even under long continued use. Another object of the invention is to provide a flexible bendable conduit for a dirt-laden air stream in which there is relatively great movement and bending along the length thereof which is of a type to dislodge adhering foreign material. Still further objects of the invention and the novel features of construction and operation will be apparent from the following specification when read with reference to the accompanying drawing, in which:

Fig. 1 is a view in side elevation of a suction cleaner embodying the invention;

Fig. 2 is an enlarged fragmentary view in central longitudinal section of a part of the structure shown in Fig. 1 and illustrates the connection flexed to form an angle;

Fig. 3 is an enlarged plan view of certain of the parts shown in Fig. 1;

Fig. 4 is an enlarged view in rear elevation of the parts shown in Fig. 3;

Fig. 5 is a much enlarged fragmentary view in central longitudinal section of certain of the parts as shown in Fig. 2 but with the connection straightened to form a straight conduit;

Fig. 6 is an enlarged fragmentary view in side elevation, similar to Fig. 1, and showing a modified structure for supporting the upper end of the bag; and Fig. 7 is an enlarged view in transverse section taken on line 7—7 of Fig. 6.

In Fig. 1, a suction cleaner casing 11 is shown as supported upon wheels 12 and having a nozzle 13 arranged for engagement by the carpet, or other floor covering to be cleaned, an electric motor, indicated generally at 14, being carried by the casing 11 and adapted to operate a fan, not shown, which discharges rearwardly through an outlet 15. If desired, the cleaner may include a device, not shown, for agitating the carpet, located above the opening of the nozzle 13 and operated by the motor 14. A handle bail 16 is pivoted to the cleaner casing at 17, and to it is rigidly connected a tubular handle 18 which is preferably provided with a plate 19 supporting a switch 20 and an electric cable 21 for supplying and controlling the current for operating the motor 14, it being understood that suitable connecting wires are provided in the tubular handle 18. These parts are of well known construction and are not described in detail as they may vary greatly without materially affecting the structure in which the present invention is embodied.

In order to prevent flexure of the dust-filtering bag 22 by movement of the handle 18, and limit any bending of the material of the bag to that resulting from inflation and deflation thereof, the lower end of the bag is connected to a pivotally mounted member which has a rigid arm movably connected at its upper end to the handle, and from which upper end the top of the bag is yieldably supported to allow for variations in length of the bag due to inflation. The pivotally mounted member, to which the bag is detachably secured, is connected by a flexible tubular member to an attaching ring which itself is preferably detachably secured to the discharge outlet of the cleaner.

The discharge outlet 15 of the cleaner, as shown, is provided with a flat circular flange 23 widened at the sides to form lugs in which threaded studs are mounted, and nuts 24 are mounted upon these studs to secure a flat attaching ring 25 in place against the flange 23, by engagement with laterally projecting slotted ears 26. The flat face of the ring 25 which engages the flange 23 is formed with an annular groove to receive a packing 27, preferably of felt or similar material, and laterally spaced lugs 28 project rearwardly from the upper part of the ring 25, and to such lugs a short tubular coupling member 29 is pivotally connected by a laterally extending pin 30 passing through the lugs 28 and an arm 31 on the coupling member. A heavy upwardly projecting lug 32 is provided on the arm 31 and is bored to receive a rigid rod 33 which is secured thereto by a rivet 34, or similar means, the rod 33 extending upwardly adjacent to and below the handle 18 to a point adjacent the upper end of the bag 22, and preferably curved downwardly at its end, as shown at 35 and provided with a hook 36. A coiled tension spring 37 is used to connect the upper end of the rod 33 to the handle, being secured to the rod in any suitable manner and being connected at its upper end, if desired, to a perforated tab 38 which is bent down from the switch-carrying plate 19. The upper end of the bag 22 is preferably open, to facilitate emptying, the end being preferably folded and held closed by a clamping device 39 which is secured to the hook 36 and acts as a link which permits a swinging movement of the end of the bag as the bag is inflated or deflated.

A flexible tubular member 40 is provided to connect the ring 25 and the tubular coupling member 29, and is formed of rubber with preformed corrugations 41 which are considerably wider at the bottom than at the top, as shown in Figs. 2 and 4. The flexible member 40 may be moulded, if desired, but is preferably formed electrolytically by a process known as the "anode process," the initial shape of the member being preferably that in which it is held when the handle 18, and consequently rod 33 and coupling member 29, are in the intermediate position most frequently occupied during use of the cleaner. The internal diameter of the flexible member 40 is substantially equal to that of the ring 25 and the coupling member 29, and it is secured to them by split spring members 42 and 43 which compress the ends of the member 40 outwardly into annular grooves 44 and 45, respectively, in the ring and coupling member.

Upon its outer cylindrical surface the coupling member 29 is formed with a plurality of bayonet slot grooves 46, preferably three, and a bag clamping ring 47 is adapted to be telescopically engaged upon the coupling member 29, being provided with inwardly directed projections 48 engaging in the bayonet grooves 46. It is preferable that the projections 48, and the corresponding grooves 46, be spaced unequally from each other, so that the parts will register in only one position. The tubular body of the bag clamping ring 47 is provided with an annular flange 49 spaced outwardly therefrom and carrying a spring clamp and a lever 50, or other means for contracting such clamp, so that the mouth of the bag 22 may be inserted between the body of the member 47 and its flange 49 and detachably clamped in place.

A modified structure for movably supporting the upper end of the rod 33 is shown in Figs. 6 and 7, the yielding spring support being replaced by a sliding support by securing rollers 51 on a pintle 52 in a bracket 53 which is secured to the rod 33, the bracket 53 passing through a slot 54 in the handle 18, and the rollers 51 engaging the inner surface of the handle adjacent such slot. To limit the entry of the bracket 53 in the slot 54, a track 55 of channel form is provided in the handle 18, overlying the rollers 51 and guiding them, and secured in place by lugs 56 which pass through openings in the handle 18 and are bent over as shown in Fig. 7.

In either modification shown, it will be apparent that the rigid connection between rod 33 and the bag clamping ring 47 will prevent any flexure of the bag 22 upon movement of the handle 18, all of the bending to compensate for various positions of the handle being afforded by the corrugated flexible connecting member 40. At the same time, the dust bag 22 may be readily removed or replaced and, upon inflation or deflation, when the cleaner is started or stopped, may change in length without being placed under any considerable endwise tension. The construction permits the use of dust bags formed of material which is inexpensive but of insufficient strength to resist the repeated bendings which would occur if the mouth of the bag were connected directly to the cleaner outlet, or in any structure in which the top of the bag is supported directly from the handle so that it is subjected to endwise tension.

It will be understood that many changes may be made in the details of construction and in the size and shape of parts within the scope of the invention, which is defined in the following claims:

I claim:

1. A coupling and supporting device for movably attaching a dust filtering bag to the exhaust outlet of a suction cleaner comprising a pair of rings hinged together, a flexible tubular member forming an air passageway connecting said rings, an arm rigidly connected to one of said rings and adapted to support one end of the bag, and means on said ring for detachably connecting the other end of the bag thereto.

2. A coupling and supporting device for attachment of a dust filtering bag to a suction cleaner, comprising a ring adapted to be detachably secured to the suction cleaner outlet, a tubular coupling member pivotally connected to said ring, a flexible tubular member connecting said ring and said coupling member, an arm rigidly connected to said coupling member and adapted to be moved by the handle of the suction cleaner, and a second tubular coupling member detachably connected to said first coupling member and having means thereon for detachably securing the dust bag thereto.

3. A coupling and supporting device for attachment of a dust filtering bag to a suction cleaner, comprising a pair of rings pivoted together at one edge, and a flexible tubular member connecting said rings, said flexible member being formed with circumferential corrugations increasing in depth from a point adjacent the point of pivotal connection of said rings to a point radially remote therefrom.

4. A suction cleaner comprising a body provided with a discharge outlet and having an upwardly extending handle pivoted thereto, a ring carried by said outlet and pivotally mounted at a point spaced from the pivot of said handle, a flexible tubular member connecting said ring and said outlet, an upwardly extending support rigidly connected to said ring and movably supported by said handle, and a dust bag connected to said ring and supported at its upper end by said support.

5. A suction cleaner comprising a body provided with a discharge outlet and having an upwardly extending handle pivoted thereto, a ring carried by said outlet and pivotally mounted at a point spaced from the pivot of said handle, a flexible tubular member connecting said ring and said outlet, an upwardly extending support rigidly connected to said ring, and means yieldably connecting the upper end of said support and said handle.

6. A suction cleaner comprising a body provided with a discharge outlet and having an upwardly extending handle pivoted thereto, a ring carried by said outlet and pivotally mounted at a point spaced from the pivot of said handle, a flexible tubular member connecting said ring and said outlet, a support arm rigidly connected with said ring, and means slidably supporting the upper end of said support arm from said handle.

7. A coupling and supporting device for attachment of a dust filtering bag to a suction cleaner, comprising a pair of rings pivotally associated at one edge, and a flexible and extensible tubular member connecting said rings, said flexible member having a circumferentially extending corrugation therein increasing in depth in both directions from a point adjacent said point of pivotal association of said rings to a point radially more remote therefrom.

8. A flexible member for connecting a dust filtering bag to the outlet of a suction cleaner, comprising a tube of resilient material having straight end portions and formed with a circumferentially extending corrugation between said end portions, the normal formation of said member when free from strain being such that the end portions of said member are disposed at an angle to each other to form a bend, the radial depth of said corrugation increasing in both directions from a minimum on the inside of said bend to a maximum on the outside of said bend.

9. A detachable coupling and supporting device for the attachment of a dust filtering bag to the exhaust outlet of a suction cleaner of the type including a nozzle, an exhaust outlet, and suction-creating means therebetween, comprising a pair of rings one of which is adapted to seat upon the exhaust outlet of a suction cleaner, means at one side of said rings for pivotally connecting said rings for movement toward and from each other, and a flexible corrugated tubular member forming an air passageway connecting said rings and adapted to expand and contract upon pivotal movement of said rings, the maximum expansion and contraction taking place on the side of said tubular member spaced a maximum distance from the pivotal axis.

10. A detachable coupling and supporting device for the attachment and movable mounting of a dust filtering bag to and on a suction cleaner of the type including a nozzle, an exhaust outlet, and suction-creating means therebetween, comprising a rigid apertured mounting element adapted to be secured to the suction cleaner exhaust outlet, a second apertured rigid mounting element adapted to seat a dust bag, a corrugated bellows-like conduit for air connecting the apertures in said mounting elements, a rigid means connecting said mounting elements for pivotal movement about an axis closely adjacent one side of said conduit whereby upon relative pivotal movement of said mounting elements the side of said conduit spaced a maximum distance from said axis receives the greatest expansion and contraction.

11. In a suction cleaner of the type including a nozzle and suction-creating means connected to said nozzle; an exhaust outlet for dirt-laden air, a corrugated bellows-like conduit connected at one end to said exhaust outlet, bag-mounting means at the opposite end of said conduit, and means pivotally connecting said bag-mounting means to said exhaust outlet for relative movement about an axis above and adjacent said conduit whereby the lower side of said conduit receives maximum expansion and contraction upon the pivotal movement of said bag-mounting means.

12. In a suction cleaner of the type including a nozzle and suction-creating means connected to said nozzle; an exhaust outlet for dirt-laden air, a corrugated flexible bellows-like conduit connected to said exhaust outlet, bag-mounting means at the outer end of said conduit, and means pivotally connecting said bag-mounting means to said exhaust outlet for pivotal movement about an axis above and adjacent said conduit whereby the lower side of said conduit receives maximum expansion and contraction upon the pivotal movement of said bag-mounting means to effect dislodgement of residual foreign material.

13. In a suction cleaner of the type including a nozzle, an exhaust outlet, and suction-creating means therebetween; a dirt-filtering bag and means to connect flexibly said bag to said exhaust outlet, said means comprising a flexible bellows-like conduit interiorly connecting said bag to said exhaust outlet and a rigid pivotal mounting between the ends of said conduit the axis of which lies above said conduit whereby maximum extension and compression takes place along the lower side of said conduit upon movement of said bag relative to said exhaust outlet.

14. In a suction cleaner of the type including a nozzle, an exhaust outlet, and suction-creating means therebetween; a dirt-filtering bag having an open mouth at its lower end, a bag ring sealing the mouth of said bag, a pivotal connection between said ring and said exhaust outlet the axis of which extends transversely of said mouth and adjacent the top of said ring, a corrugated bellows-like conduit connecting said ring and said exhaust outlet and positioned below said axis, an operating handle pivotally connected to said cleaner and supporting the upper end of said bag, and means to vary positively the angular position of said ring relative to the exhaust outlet upon the pivotal movement of said handle relative to said cleaner.

HARRY B. WHITE.